(12) United States Patent
Dunn et al.

(10) Patent No.: US 10,372,585 B2
(45) Date of Patent: Aug. 6, 2019

(54) INCIDENT TRACKER

(71) Applicant: Facebook, Inc., Menlo Park, CA (US)

(72) Inventors: Jeffrey Scott Dunn, Seattle, WA (US); Hangjin Zhang, Redmond, WA (US); Eun Chang Lee, San Mateo, CA (US); David Ross Harrington, San Francisco, CA (US); Joel F. Beales, Seattle, WA (US); Lifei Huang, Hunts Point, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/806,292

(22) Filed: Nov. 7, 2017

(65) Prior Publication Data

US 2019/0138426 A1 May 9, 2019

(51) Int. Cl.
*G06F 9/44* (2018.01)
*G06F 11/36* (2006.01)

(52) U.S. Cl.
CPC ...... *G06F 11/3608* (2013.01); *G06F 11/3664* (2013.01)

(58) Field of Classification Search
CPC ............ G06F 11/3466; G06F 11/3688; G06F 2201/865; G06F 11/3664; G06F 11/3409

USPC .......................................................... 717/124
See application file for complete search history.

(56) References Cited

U.S. PATENT DOCUMENTS

| 7,802,236 | B2 * | 9/2010 | Calder | ............... | G06F 11/3466 717/130 |
| 2002/0166112 | A1 * | 11/2002 | Martin | ............... | G06F 11/3447 717/124 |

* cited by examiner

*Primary Examiner* — Chuck O Kendall
(74) *Attorney, Agent, or Firm* — FisherBroyles, LLP

(57) ABSTRACT

A system and method that automatically detects that a regression incident has occurred, and identifies the particular revision(s) of source code that introduced the regression incident is disclosed herein. The system and method execute one or more simulations of each revision in a window of revisions of the source code to compute values for one or more metrics. The metric values are then used to compute regression confidence values as well as a regression confidence interval—to then detect a regression incident and identify the revision that caused the regression incident. The system and method can also identify subsequent revision(s) that sufficiently fix regression incident(s) caused by a revision such that a software developer can be informed of these fixing revisions.

20 Claims, 11 Drawing Sheets

INCIDENT TRACKER

BACKGROUND

Software applications and products are typically subjected to various test cases prior to and in the early stages of development and deployment. Software testing involves the execution of a software component or system component to evaluate one or more properties (e.g., metrics) of interest. In general, these properties indicate the extent to which the component or system under test meets the requirements that guided its design and development, and responds correctly to all kinds of inputs. These properties are also useful to evaluate whether the component or system under test performs its functions within an acceptable time, is sufficiently usable, can be installed and run in its intended environments, and achieves the general result its stakeholders desire.

The software code for an application is generally stored in a code repository. When a change is made to a portion of the software code, it is "checked-in" or "committed" to the repository. Upon each committal, a test plan may execute one or more test cases with the intent of finding software bugs (errors or other defects), and verifying that the software application is fit for use. For example, during bug fixing or feature enhancement, a fairly typical design practice involves running (or re-running) all of the test cases in a test plan for the software application to help validate (or re-validate) the application and make sure the new code changes do not "break" any existing functionality.

Different types of tests can be executed to identify software bugs (errors or other defects), and verifying that the software application is fit for use: installation testing, compatibility testing, smoke and sanity testing, acceptance testing, and regression testing. Regression testing verifies that software which was previously developed and tested still performs the same way after it was changed or interfaced with other software. Changes may include software enhancements, patches, configuration changes, etc. During regression testing, new software bugs or regressions may be uncovered. Sometimes a software change impact analysis is performed to determine what areas could be affected by the proposed changes. These areas may include functional and non-functional areas of the system. The purpose of regression testing is to ensure that changes such as those mentioned above have not introduced new faults. One of the main reasons for regression testing is to determine whether a change in one part of the software affects other parts of the software.

Common methods of regression testing include re-running previously completed tests and checking whether program behavior has changed and whether previously fixed faults have re-emerged. Regression testing can be performed to test a system efficiently by systematically selecting the appropriate minimum set of tests needed to adequately cover a particular change. However, existing techniques for regression testing typically take a long time to execute, thus prolonging software development test cycles. Moreover, existing techniques are unable to efficiently and effectively identify regression incidents when several revisions are made to the source code of the software application in a short duration of time and/or in quick succession.

BRIEF DESCRIPTION OF THE DRAWINGS

The techniques introduced here may be better understood by referring to the following Detailed Description in conjunction with the accompanying drawings, in which like reference numerals, indicate identical or functionally similar elements.

DETAILED DESCRIPTION

Figure 1:
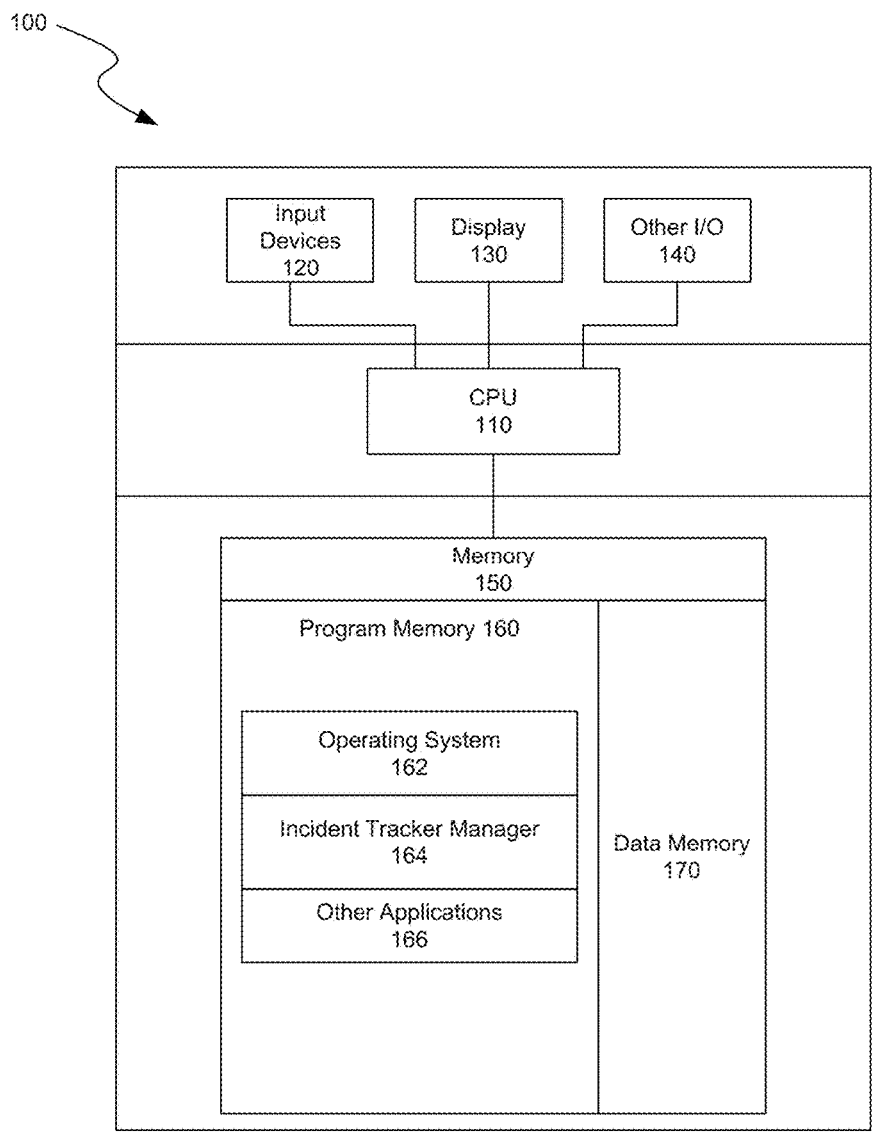
FIG. 1 is a block diagram illustrating an overview of devices on which some implementations can operate.

An incident tracker system and method that enables detection and identification of regression incidents is disclosed herein. The system can evaluate source code change revisions to detect and identify the revision(s) that result in a regression incident. In some implementations, for each revision being evaluated (current revision), the system identifies a set of revisions relative to the current revision. For example, the system can identify a set of revisions before and a set of revisions after the current revision (e.g., four revisions before and four revisions after the current revision). The system can compute values for one or more properties (e.g., metrics) of interest for each revision in the set of revisions. The system can utilize the computed metric values and perform different regression detection techniques (e.g., change point analysis, simulation analysis, etc.) to detect that a potential regression incident has occurred. The system can then use various regression identification techniques (e.g., bisection, simulation analysis, etc.) to identify the specific revision(s) that may have introduced the regression incident. For example, code bisection can employ a divide and conquer algorithm to narrow the scope of revisions and identify the specific revision that introduced the regression incident. Simulation analysis can be used to both detect a regression incident and identify a specific revision as one that introduced the potential regression.

The system can execute the regression detection and identification techniques on several revisions, in a continuous manner, to generate a set of candidate potential regression revisions. The system can then perform one or more regression analysis techniques on this set. For example, the system can perform deduplication on the set of candidate potential regression revisions to identify revisions that similarly impact the source code (e.g., result in similar performance degradation). In some implementations, the system can gather data for multiple metrics (e.g., number of bytes read from memcache, number of bytes read from storage, CPU instructions, etc.) and perform correlation functions on that data to identify whether two or more of the metrics may be correlated. In such instances, the system can determine whether the regression incidents, identified using the data for each correlated metric, are correlated (single regression) or not (different regressions). Similarly, the system can further identify two or more metrics that trigger a regression incident in a similar manner so that these metrics can be reported together to a user (e.g., system administrator).

Once one or more candidate potential regression revisions corresponding to one or more regression incidents are identified, the system can identify one or more actions on each detected regression incident. For example, the system can file new tasks for the regression incidents (e.g., fix the regression incident, track the regression incident fix(es), report the regression incident, etc.), manage the workflow, etc. The actions can be managed using, for example, a configuration file, a user dashboard (e.g., system administrator dashboard), etc.

Thus, there exists a need for a software testing system and method that overcomes these and other drawbacks of existing test methodologies. A new system and method is disclosed that automatically detects that a regression incident has occurred, and identifies the particular revision(s) of source code that introduced the regression incident. The system and method execute one or more simulations of each revision in a window of revisions of the source code to compute values for one or more metrics. The metric values are then used to compute a regression confidence value as well as regression confidence interval—to then detect a regression incident and identify the revision that caused the regression incident. The system and method can also identify subsequent revision(s) that sufficiently fix regression incident(s) caused by a revision such that a software developer can be informed of these fixing revisions.

The disclosed system and method have several advantages. Although several advantages are described in this disclosure, not all advantages are required in each implementation of the system. Also, some advantages will become apparent to those having ordinary skill in the art after reviewing the disclosure. One advantage is that the incident tracker can automatically detect regression incidents and identify revision(s) that introduced the regression incidents in a continuous manner. Another advantage of the incident tracker is that it can identify similarities (e.g., correlation) between potential regression causing revisions and one or more metrics associated with a revision, resulting in efficient reporting of incidents. For example, instead of reporting each identified potential regression causing revision, the system can report a subset of such revisions so that the system (or user) is not inundated with duplicate information and is not tasked with evaluating tasks for each such revision. The system can also automatically identify and/or execute one or more tasks (e.g., fix the regression incident, track the regression incident fix(es), report the regression incident, etc.) for regression causing revisions.

Turning now to the figures, FIG. 1 is a block diagram illustrating an overview of devices on which some implementations of the disclosed technology can operate. The devices can comprise hardware components of a device 100 that performs regression incident detection and identification. Device 100 can include one or more input devices 120 that provide input to the CPU (processor) 110, notifying it of actions. The actions are typically mediated by a hardware controller that interprets source code changes received from the input device and communicates the information to the CPU 110 using a communication protocol. Input devices 120 include, for example, a computer, a laptop, a mobile device (e.g., smartphone, tablets, etc.), or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. The display 130 can provide information related to source code revisions, regression incidents, metrics, workflow management, tasks, etc. Examples of display devices are an LCD display screen, an LED display screen, and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; rather a memory is non-transitory. Memory 150 can include program memory 160 that stores programs and software, such as an operating system 162, incident tracker manager 164, and other application programs 166. Memory 150 can also include data memory 170 that can include user data such as passwords, usernames, input text, audio, video, user preferences, and selections. Data memory 170 can also include configuration data, settings, user options, time stamps, or session identifiers. Data in memory 170 can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, mobile devices, multiprocessor systems, microprocessor-based systems, set-top boxes, programmable consumer electronics, network PCs, minicomputers, mainframe computers, and distributed computing environments that include any of the above systems or devices, or the like. Special purpose computing system environments or configurations can operate and execute a specialized set of instructions to perform the particular actions associated with a configurable data stream aggregation framework.

Figure 2:
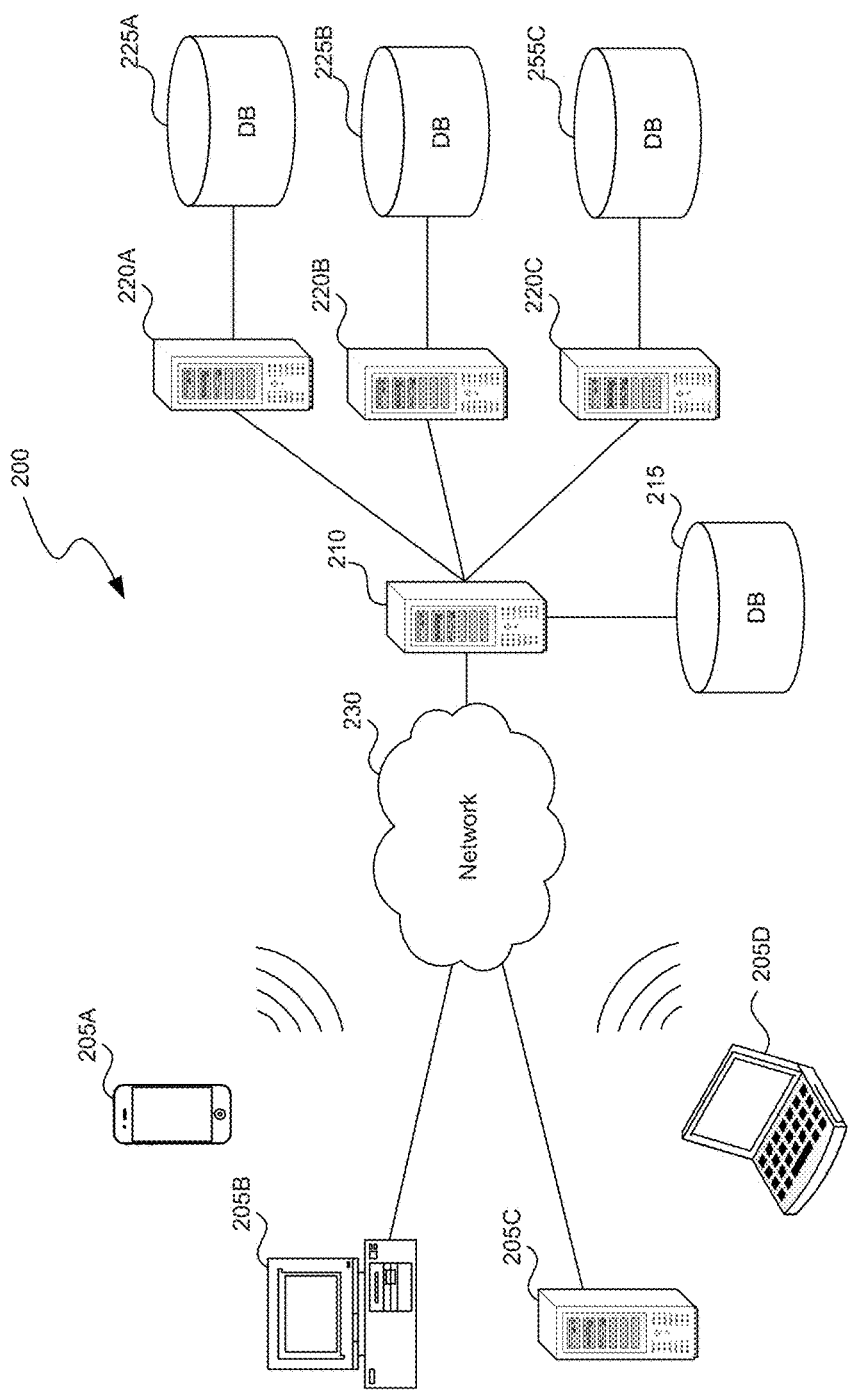
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include, but are not limited to, personal computers, server computers, handheld or laptop devices, cellular telephones, wearable electronics, tablet devices, mobile devices, multiprocessor systems, microprocessor-based systems, set-top boxes, programmable consumer electronics, network PCs, minicomputers, mainframe computers, and distributed computing environments that include any of the above systems or devices, or the like. Client computing devices 205A-D can comprise computing systems, such as device 100. Revisions to source code for software applications can be generated by one or more client computing devices 205A-D and transmitted, through network 230, to one or more computers, such as a server computing device 210. A server computing device 210 can comprise computing systems, such as device 100. Though the server computing device 210 is displayed logically as a single server, server computing devices can each be a distributed computing environment encompassing multiple computing devices located at the same or at geographically disparate physical locations. In some implementations, each server computing device 210 corresponds to a group of servers. In some implementations, a server computing device 210 can be a web server or an application server. The server computing device 210 can connect to a database 215. As discussed above, each server computing device 210 can correspond to a group of servers, and each of these servers can share a database or can have their own database. Database 215 can warehouse (e.g. store) information such as configuration parameters for executing regression incident detection and identification techniques, source code revision(s), log of regression incident detection and identification techniques, computed metric(s) data, other supporting information, etc. Though database 215 is displayed logically as a single unit, it can be a distributed computing environment encompassing multiple computing devices, can be located within its corresponding server, or can be located at the same or at geographically disparate physical locations.

Server computing device 210 can be connected to one or more devices 220A-C. The results of regression incident detection and identification techniques, as well as post-analysis techniques, can be transmitted to devices 220A-C. Examples of devices 220A-C include, but are not limited to, smartphones, tablets, laptops, personal computers, etc. Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. Although the connections between server 210 and devices 220 are shown as separate connections, these connections can be any kind of local, wide area, wired, or wireless network, including network 230 or a separate public or private network.

Figure 3:
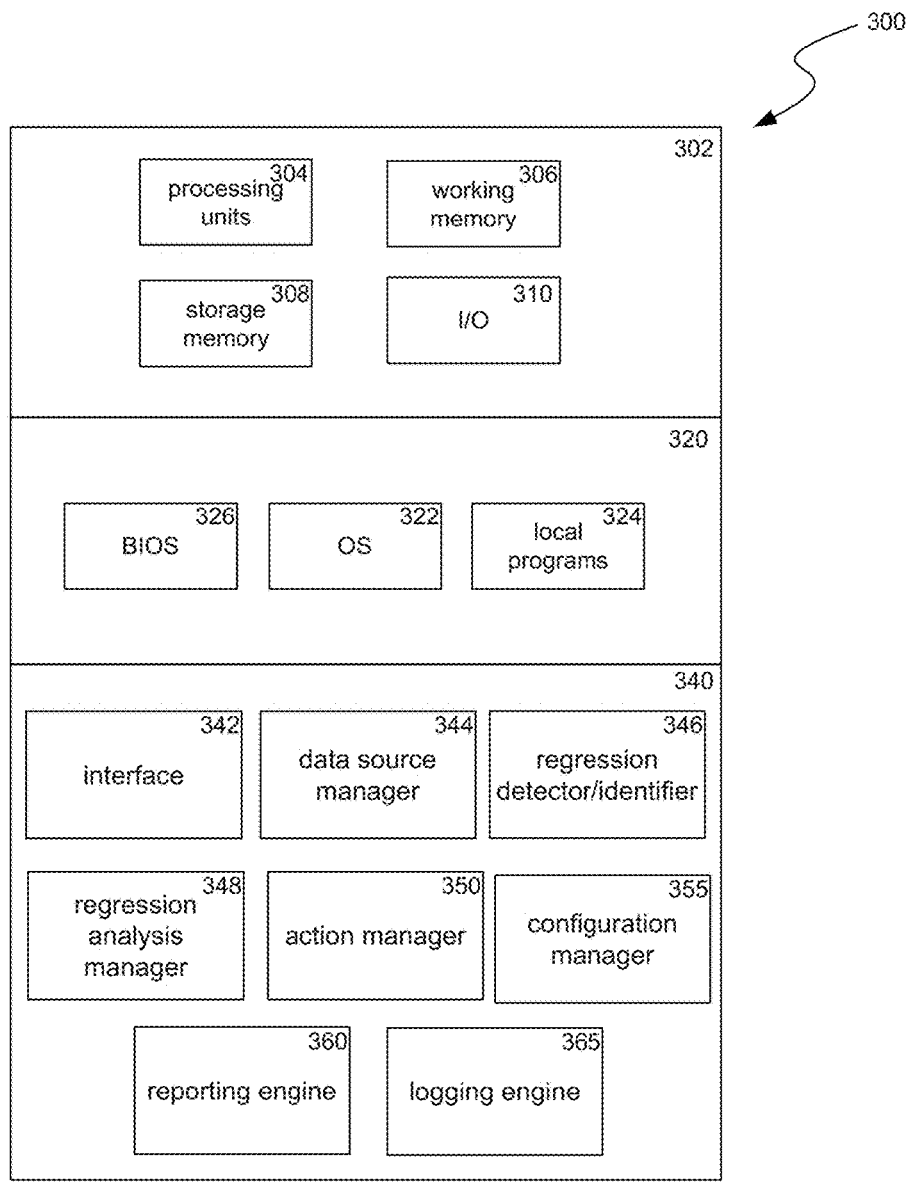
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software components 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210.

General software 320 can include various applications including an operating system 322, local programs 324, and a basic input output system (BIOS) 326. Specialized components 340 can be subcomponents of a general software application 320, such as local programs 324. Specialized components 340 can include data source manager 344, regression detector/identifier 346, regression analysis manager 348, action manager 350, configuration manager 355, reporting engine 360, logging engine 365, and components which can be used for transferring data and controlling the specialized components, such as interface 342. In some implementations, components 300 can be in a computing system that is distributed across multiple computing devices or can be an interface to a server-based application executing one or more of specialized components 340.

Data source manager 344 can generate and/or manage values for one or more metrics that are generated upon execution of source code revisions. Source code revisions are associated with source code commits to a source code repository. Continuous tests can be executed when source code is committed to the source code repository. Upon execution of the continuous tests, one or more metric values can be generated, for example, as metric(s) value time series. Examples of metrics include, but are not limited to, time to open application, time for user interaction, memory consumption, battery consumption, bytes read from memcache, CPU instructions, etc. Metric values can also be generated using other techniques, such as simulation analysis. For example, data source manager 344 can receive and/or generate metric values that are based on executing multiple simulations of one or more source code revisions. An advantage of this technique is that it minimizes the impact of noise (variance) that is typically created upon several executions of the source code.

Metric values can change from one source code commit to the next. The data source manager 344 can generate and/or manage the time series for metrics from one or more sources. For example, time series for metrics can be generated by a suite of continuous tests that are executed periodically, when a source code commit occurs, when a predetermined number of source code commits occur, etc. Data source manager 344 can receive and/or generate time series for metrics in various formats, such as graphs of metric(s) time series, Internet friendly formats (e.g., HTML, XML, XHTML, etc.), comma separated values (e.g., CSV), database friendly formats, database queries (e.g., SQL), database query results, and other formats (e.g., XLS, XLSX, etc.).

Regression detector/identifier engine 346 can detect regression incidents, and/or identify source code revision(s) that likely caused the regression incidents, based on information received from one or more data sources, such as time series for metrics. Regression detector/identifier engine 346 can implement various regression detection and/or identification techniques, such as change point analysis, simulation analysis, etc. Change point analysis can be performed on a series of time ordered metrics value data in order to detect whether any changes in the metric(s) values have occurred. Change point analysis can determine the number of changes and estimate the time of each change. Each change can correspond to a regression incident. Change point analysis can further provide confidence levels for each change and confidence intervals for the time of each change. Bisection techniques can also be utilized to identify the source code revision(s) that introduced the change (potential regression incident). For example, bisection techniques can employ a divide and conquer algorithm to narrow the scope of revisions and identify the specific revision that introduced the regression incident.

The simulation analysis techniques can be used to monitor time series for metrics to detect step-changes. Each data point in the time series can be an aggregation of data points represented in, for example <mean, standard error> form, and correspond to a source code revision (e.g., can be identified by a source code revision number, timestamp, etc.). The simulation analysis technique can select a subset of source code revisions from the set of all source code revisions to detect and identify regression incidents. For example, the simulation analysis technique can select a certain number of source code revisions before and after a current revision to detect and identify the current revision as a potential regression revision. The number of source code revisions can be predetermined (e.g., using configuration settings), or can be determined dynamically based on one or more factors (e.g., priority of change, amount of source code changed in source code revisions, time of day, special circumstances, etc.).

The simulation analysis technique overcomes the disadvantages of other regression detection and identification techniques by executing a number of simulations to remove the effect of variance in data. For example, the simulation analysis technique executes a specific number of simulations to get a substantially reliable (e.g., within a certain threshold) approximation of time series for metrics after removing variance. In each simulation for each point in the time series of a metric, the simulation analysis technique can select a point from a natural distribution (e.g., defined by <mean, standard error>). After executing the specific number of simulations, delta and standard deviation values are computed between two points in the time series (e.g., between normalized metric values for two source code revisions). Increasing the number of simulations can increase the accuracy of detecting and identifying regression incidents.

Figure 8:
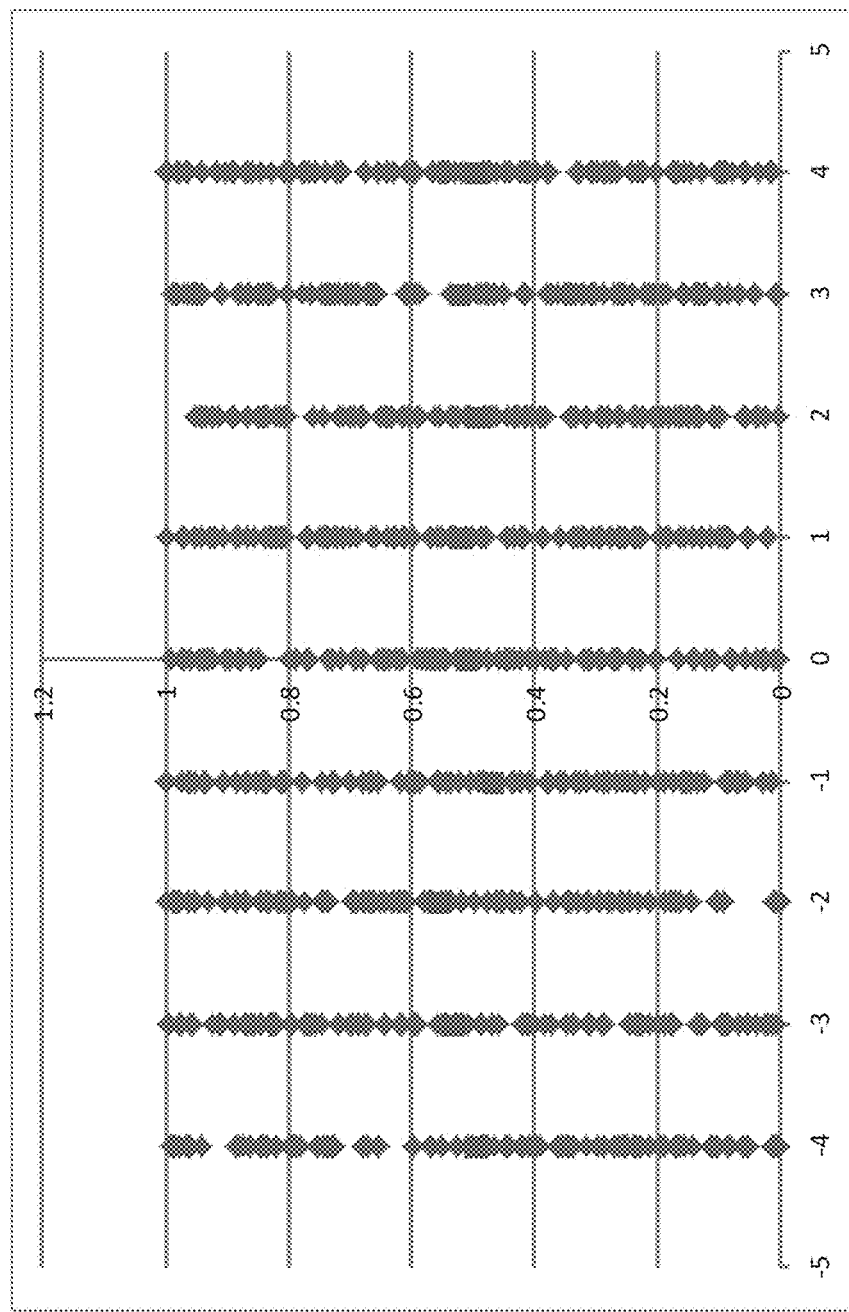
FIG. 8 is a conceptual diagram illustrating an example of a metric value time series.
Figure 9:
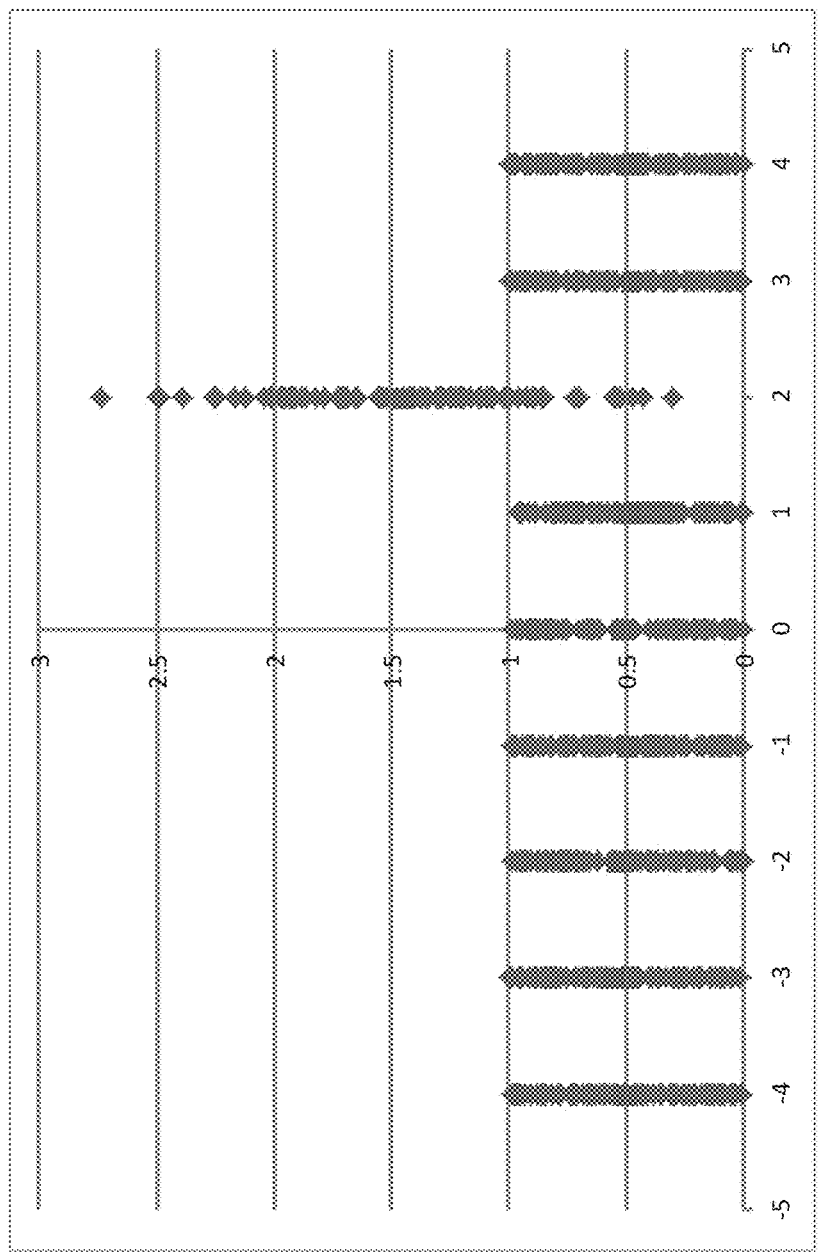
FIG. 9 is a conceptual diagram illustrating an example of a metric value time series.

FIGS. 8 and 9 illustrate examples of time series for metrics. The time series for a metric in FIG. 8 illustrates metric values for nine revisions (current revision (0), four revisions before current revision (−1, −2, −3, and −4), and four revisions after current revision (1, 2, 3, and 4)) across several simulations. As illustrated in FIG. 8, the average values of the time series for the first metric do not show much variation, and thus, it is likely, based on just the first metric values, that none of the nine revisions cause a regression incident. FIG. 9 illustrates time series for a second metric for the same set of nine revisions. As illustrated in FIG. 9, the average values of the time series for the second metric shows a large variation for revision 2. Based on the second metric values, the incident tracker system will detect a potential regression incident at revision 2 and identify it as a potential regression revision.

Figure 10:
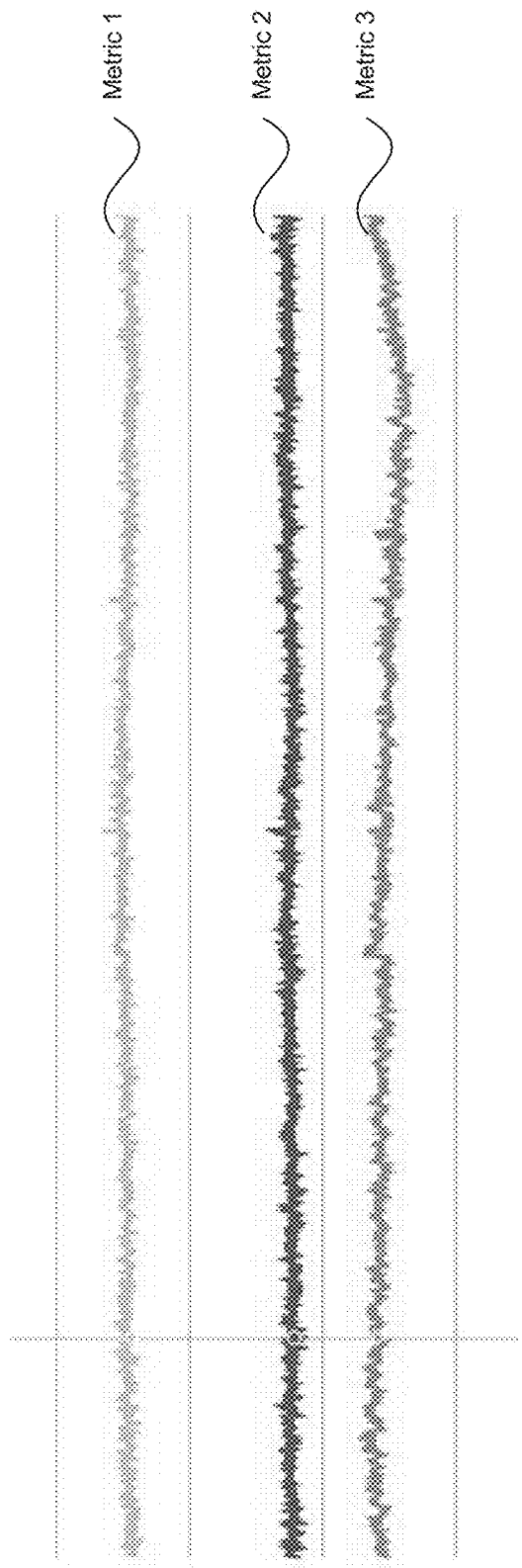
FIG. 10 is a conceptual diagram illustrating an example of regression detection based on multiple metrics.

Regression analysis manager 348 can analyze the identified potential regression revisions and perform regression analysis techniques, such as deduplication, correlation, regression, etc. For example, regression analysis manager 348 can analyze metric values that triggered the identification of the potential regression revisions to identify non-duplicated correlated metric values (e.g., CPU instructions and bytes read from memchache). Metric values can be correlated for the same revision, or across multiple revisions. Regression analysis manager 348 can group the correlated metric values prior to reporting the values. For example, as illustrated in FIG. 10, regression analysis manager 348 can group metrics 1, 2, and 3 because their values are correlated. Metrics 1, 2, and 3 can then be reported together.

Regression analysis manager 348 can also identify dependencies between revisions. For instance, regression analysis manager 348 can identify sets of revisions that comprise revisions that fix (or substantially fix) the regression incident(s) caused by a potential regression revision. For example, if revision 50 triggered a regression incident and was identified as a potential regression revision, while revision 74 fixed the regression incident created by revision 50, regression analysis manager 348 can cherry pick revision 74 and associate it with revision 50 such that a response to a request for revision 50 can include a suggestion or other indicator to also use revision 74.

Action manager 350 can schedule and/or execute actions on the identified potential regression revisions. For example, action manager 350 can create and/or execute tasks (e.g., fixing regression incidents, trigger alerts, generate reports, etc.) for the potential regression revisions. Action manager 350 can also manage the workflow for the tasks. For example, action manager 350 can manage the lifecycle of a task (from its creation to completion) and generate one or more action metrics that can then be used to generate reports related to the created tasks.

Configuration manager 355 can manage configuration parameters of the incident tracker system 300. For example, configuration manager 355 can manage settings related to the source of data (e.g., used by the data source manager 344), regression detection techniques, regression identification techniques (e.g., which technique to use for regression detection and/or identification), regression analysis parameters (e.g., which set of actions to consider), scheduling parameters, etc.

Configuration manager 355 can manage configuration parameters for each incident tracker component. For example, the configuration manager 355 can manage one or more of the following configuration parameters associated with the simulation analysis technique (utilized by the regression detector/identifier 346): window size (number of revisions considered on each side of the current revision, criteria for identifying subset of revisions, etc.), minimum number of revisions to be successfully executed in the subset of revisions (e.g., minimum number of revisions that need to be successfully executed in range [current revision−window size, current revision+window size]), regression confidence level, highest confidence radius, minimum significant change, confidence interval, number of simulations, etc. Configuration parameter values can be predetermined (e.g., static values) or can be determined dynamically based on one or more factors. For example, the value for the regression confidence level indicates the confidence that the current revision is a potential step-change (potential regression revision). The regression confidence value determined for each revision can be compared to the regression confidence level to determine whether the revision is a potential regression revision. Revisions with regression confidence values greater than the regression confidence level can be flagged as potential regression revisions.

Given a cluster of revisions, the highest confidence radius can be used to identify at least one revision that introduced the regression incident. The highest confidence radius can be determined based on the regression confidence value for each revision in the subset of revisions. For example, the highest confidence radius value can be equal to the highest value of the regression confidence for all revisions in the subset of revisions. A confidence interval can also be used to identify a particular revision as a potential regression revision. The confidence interval can be used to compute a lower bound and an upper bound for a revision. The lower bound and/or the upper bound can be used to identify a revision as a potential regression revision. For example, if a revision has its highest lower bound of its regression confidence interval within a highest confidence radius value, then the revision can be identified as a potential regression revision. Similarly, if a revision has its lowest upper bound of its regression confidence interval within a highest confidence radius value, then the revision can be identified as a potential regression revision.

Reporting engine 360 can perform analytics and reporting functions related to incident tracker scheduling and execution. Reporting engine 360 can generate predefined, user defined, and/or ad hoc reports and analytical results based on data values in one or more output data stream(s). Logging engine 365 can maintain a log of source code revisions, incident tracker scheduling and execution (including details such as source code revisions processed), identified potential regression revisions, technique(s) used for regression detection/identification, techniques used for regression analysis, actions performed, schedule timestamps, expected execution timestamps, actual execution timestamps, total execution time, execution results, etc.

Figure 4:
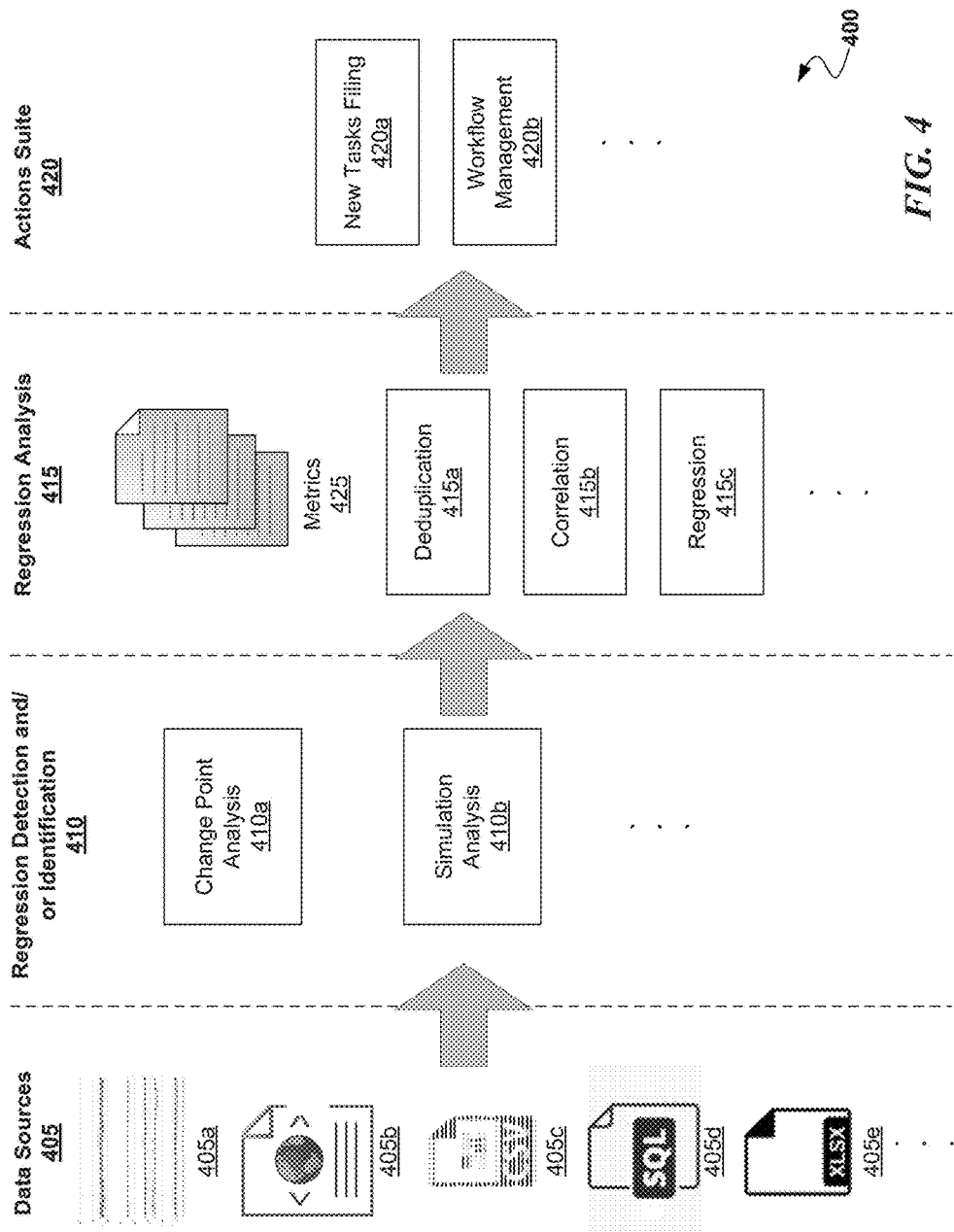
FIG. 4 is a sequence diagram which, in some implementations, can be used in a system employing the disclosed technology.

FIG. 4 is a sequence diagram which, in some implementations, can be used in a system employing the disclosed technology. An incident tracker system 400 can be configured in a modular fashion to comprise items from one or more of the following components: data sources 405, suite of regression detection and/or identification techniques 410, suite of regression analysis techniques 415, and actions suite 420. Data sources 405 can generate and/or manage information related to source code revisions. For example, a data source can generate and/or manager time series data for one or more metrics generated upon execution of source code revisions. Data sources 405 can comprise systems for generating and/or receiving data that may be used for regression detection and/or identification (e.g., continuous testing systems). Examples of data sources 405 include, but are not limited to, systems generating data in the following formats: graphs of metric(s) time series 405a, Internet friendly formats (e.g., HTML, XML, XHTML, etc.) 405b, comma separated values (e.g., CSV) 405c, database friendly formats, database queries (e.g., SQL) 405d, database query results, and other formats (e.g., XLS, XLSX, etc.) 405e, etc.

Data from data sources 405 can be used by a suite of regression detection and/or identification techniques 410. The suite of regression detection and/or identification techniques 410 comprises various methods for detecting regression incidents as well as methods for identifying the trigger(s) of the regression incidents (e.g., change point analysis 410a, simulation analysis 410b, etc.). The incident tracker system 400 can select one of the techniques from the suite based on configuration parameters. For example, the incident tracker system 400 can select the simulation analysis technique if the current time is before noon, and can select the change point analysis technique for all other times. As another example, the incident tracker system 400 can select the simulation analysis technique for every 50 source code revisions, and can select another technique (e.g., change point analysis) for all other revisions. The suite of regression detection and/or identification techniques 410 generates candidates for potential regression incidents and/or identifies revisions that likely caused the regression incidents. The suite of regression detection and/or identification techniques 410 can also identify metrics (and their associated values) that were used to identify the potential regression incidents.

One or more items from the suite of regression analysis techniques 415 can then be used to analyze the information generated by items from the suite of regression detection and/or identification techniques 410 using various techniques, such as deduplication 415a, correlation analysis 415b, regression analysis 415c, etc. For instance, the suite of regression analysis techniques 415 can perform deduplication on the set of candidate potential regression revisions to identify revisions that similarly impact the source code (e.g., result in similar performance degradation). In some implementations, the suite of regression analysis techniques 415 can gather data for multiple metrics 425 (e.g., number of bytes read from memcache, number of bytes read from storage, CPU instructions, etc.) and perform correlation functions on that data to identify whether two or more of the metrics may be correlated. In such instances, the suite of regression analysis techniques 415 can determine whether the regression incidents, identified using the data for each correlated metric, are correlated (single regression) or not (different regressions). Similarly, the suite of regression analysis techniques 415 can further identify two or more metrics that trigger a regression incident in a similar manner so that these metrics can be reported together.

Items from the action suite 420 can then be used to take actions on each detected incident. Examples of actions include, but are not limited to, new tasks filing 420a, workflow management 420b, etc. In some implementations, the actions suite 420 can interact with other systems to perform the actions. For example, the actions suite 420 can interact with a workflow management system to track the workflow associated with a task (e.g., workflow associated with the task of fixing the regression incident).

The incident tracker system 400 can set configuration parameters that are used to determine items from the set of components to be used as well as the specific techniques within each component. For example, the incident tracker system 400 can utilize a configuration that defines the following components and techniques: data sources 405 (graph of metrics time series 405a), regression detection and/or identification 410 (simulation analysis 410b), and actions suite 420 (workflow management 420b). the configuration parameters can vary based on various factors, such as priority of change, amount of source code changed in source code revisions, time of day, special circumstances, etc.

Figure 5:
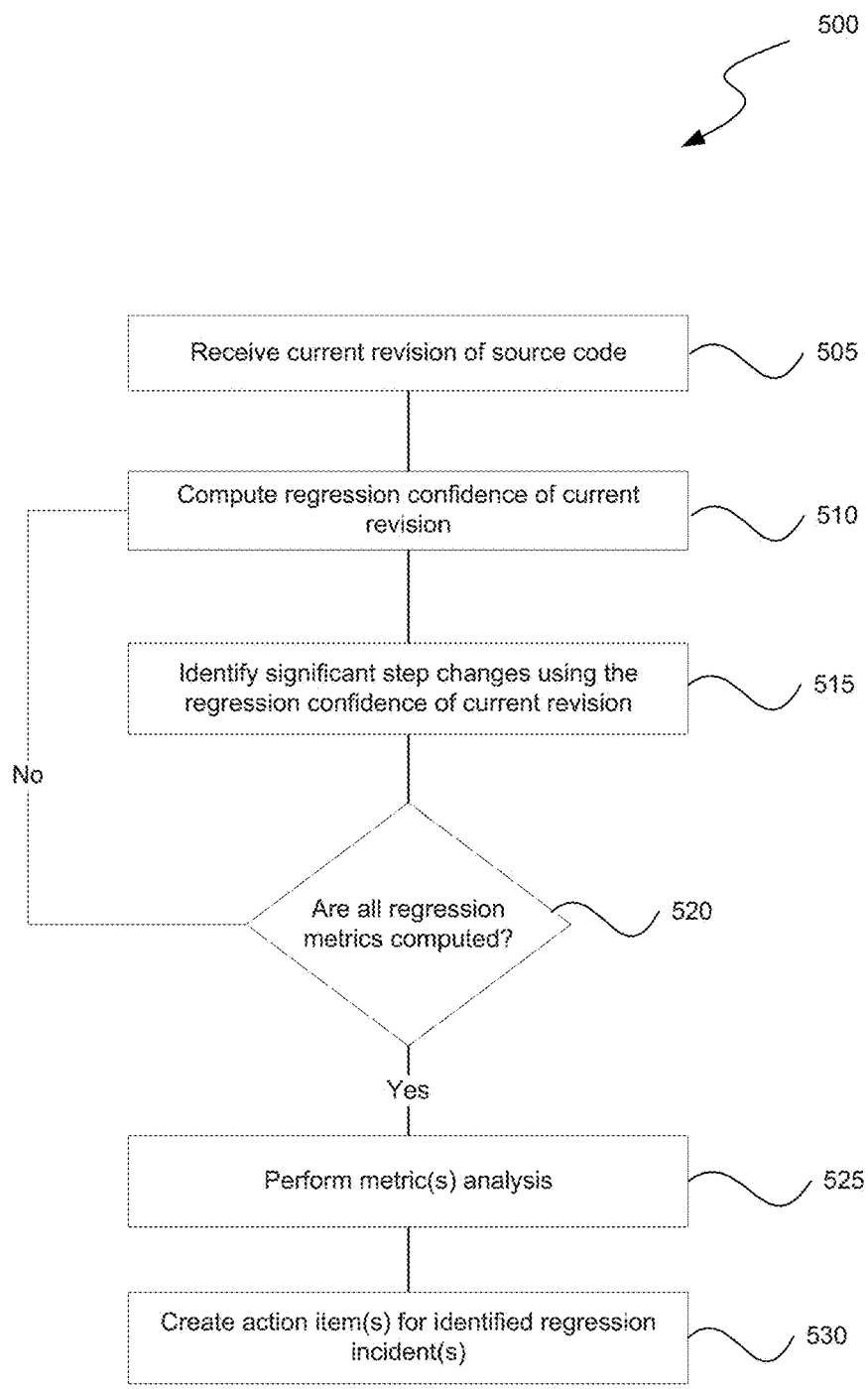
FIG. 5 is a flow diagram illustrating a process used in some implementations for dynamic scheduling of test cases.
Figure 6A:
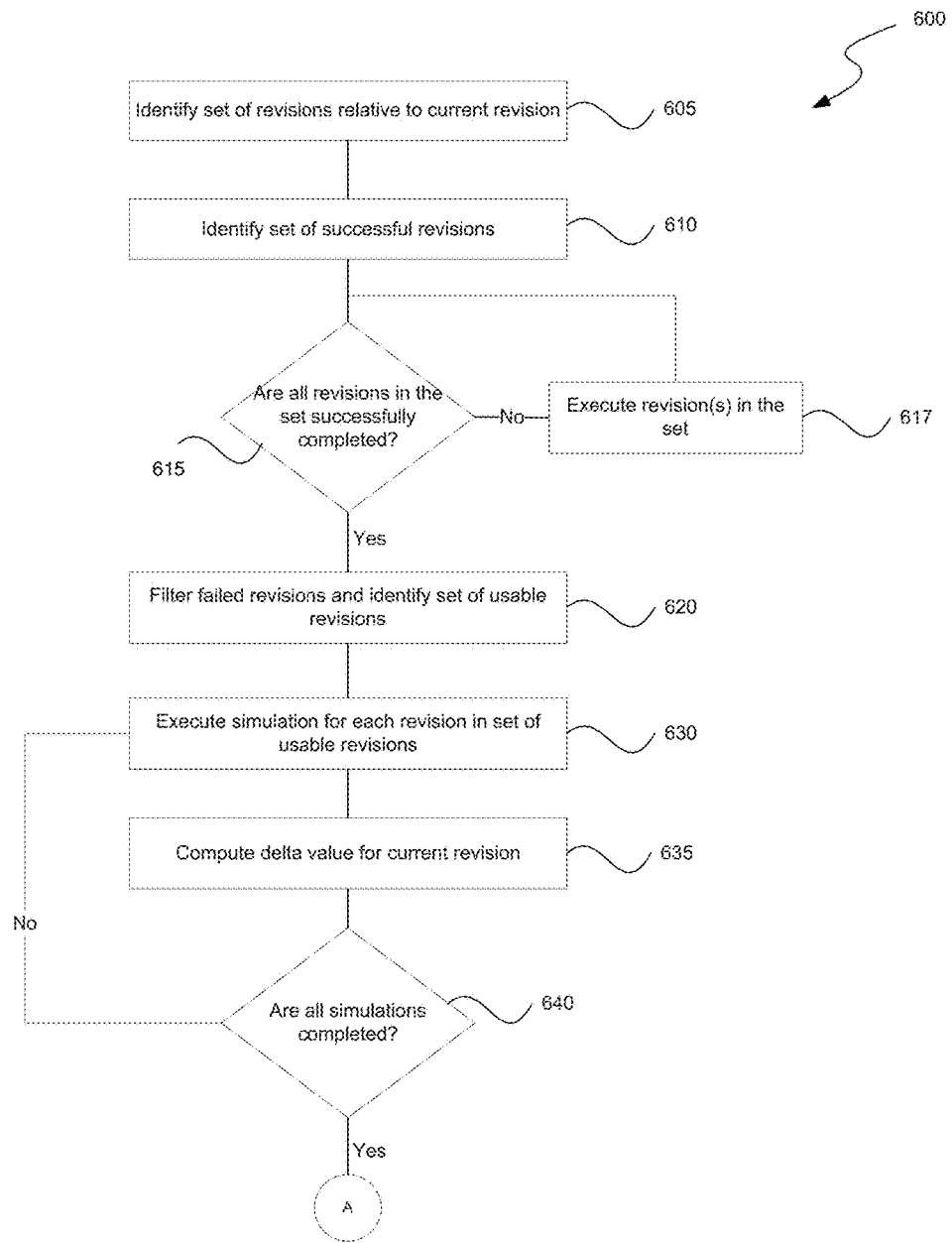
FIG. 6A-6B show a flow diagram illustrating a process used in some implementations for adjusting the urgency value of test cases.
Figure 6B:
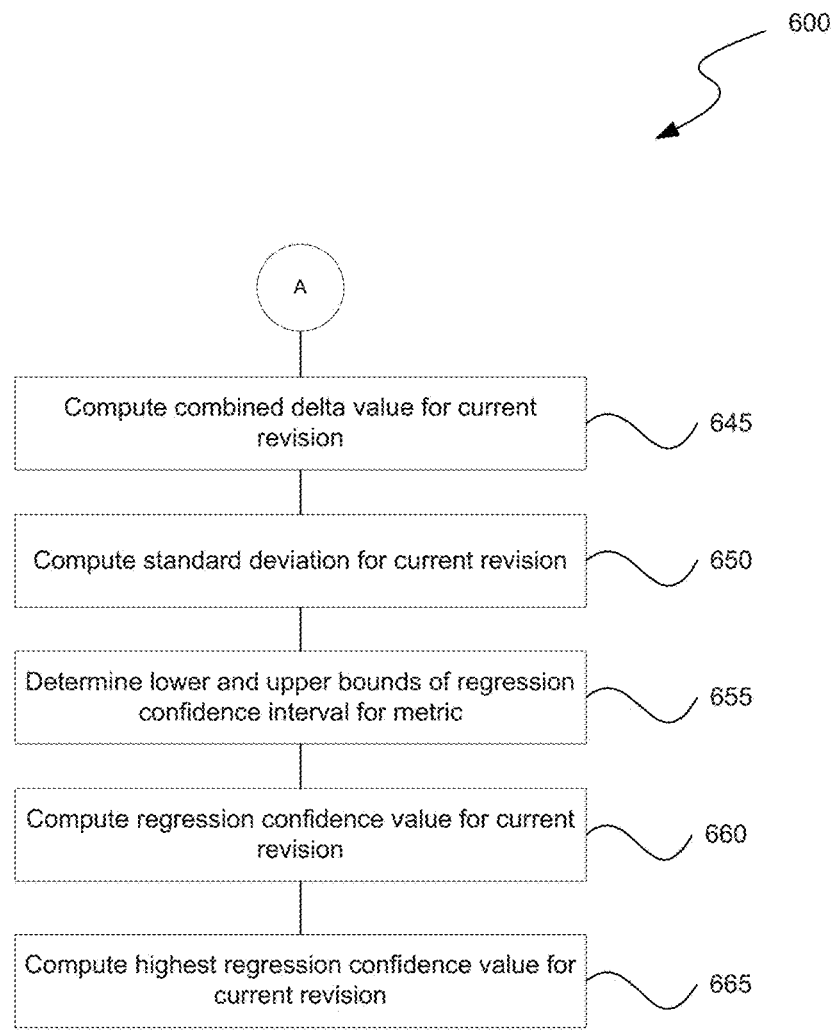
Figure 7:
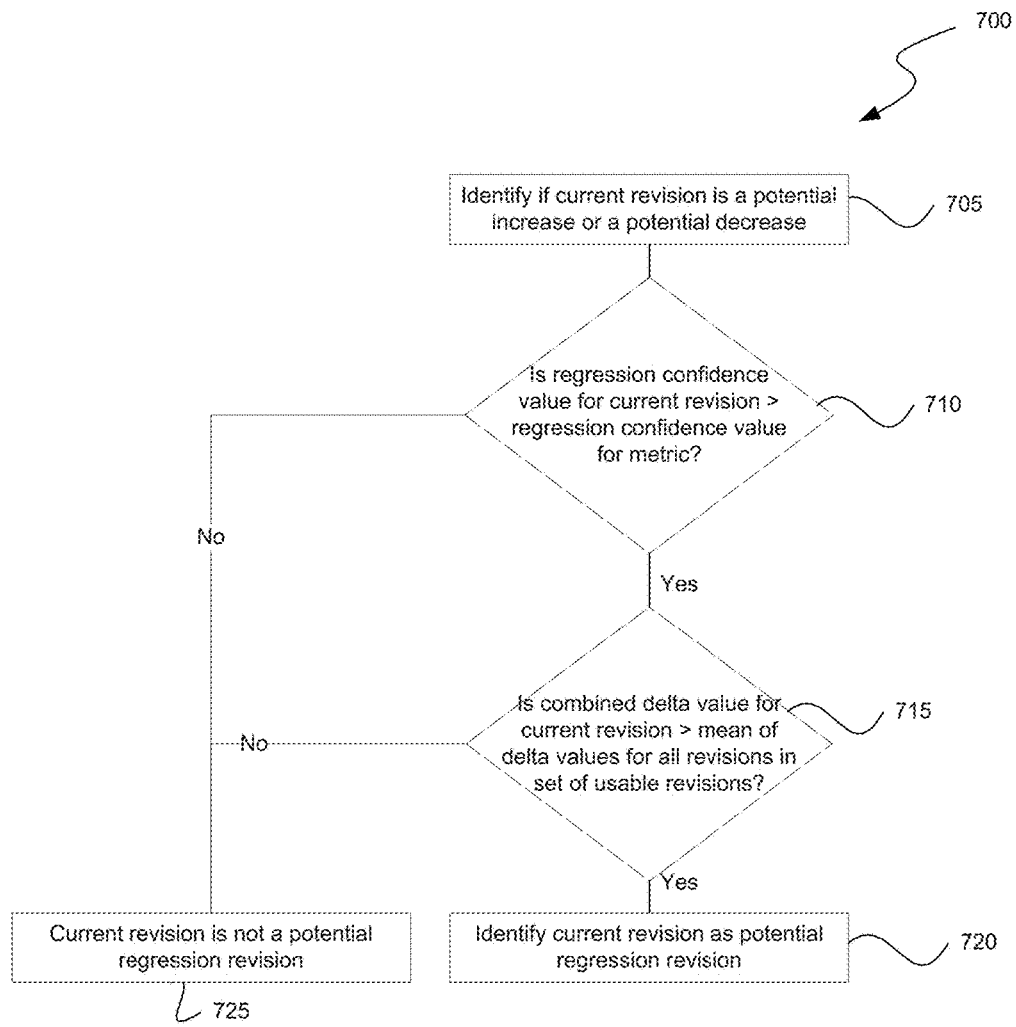
FIG. 7 is a flow diagram illustrating a process used in some implementations for adjusting the urgency value of test cases.

FIG. 5 is a flow diagram illustrating a process 500 used in some implementations for tracking regression incidents. Process 500 begins at block 505 upon receipt of a current revision of source code. One or more metric value time series can be received at step 505. Examples of metrics include, but are not limited to, time to open the application, time to complete a user interaction, memory consumption, battery consumption, bytes read from memcache, CPU instructions, etc. Process 500 then continues to block 510 where it computes regression confidence of a metric for the current revision. FIGS. 6A-6B illustrate a flow diagram of a process used in some implementations for computing the regression confidence of the current revision. At block 515, process 500 identifies significant step changes (regression incidents) using the computed regression confidence. FIG. 7 illustrates a flow diagram of a process used in some implementations for identifying significant step changes.

At decision block 520, process 500 determines whether values for all relevant metrics have been computed and analyzed (e.g., by computing regression confidence values for each metric and using the computed values to identify potential regression incidents). If all metrics have not been analyzed, process 500 returns to block 510 to repeat the process for the remaining metrics. Otherwise, if all metrics have been analyzed, process 500 continues to block 525 to perform analysis on the metric(s) value time series. For example, process 500 can perform techniques such as deduplication, correlation, regression, etc. to identify similarities (e.g., correlation) between potential regression causing revisions and/or one or more metrics associated with a revision, resulting in efficient reporting of incidents. At block 530, process 500 can create action item(s) for the identified regression incident(s). Examples of action item(s) include, but are not limited to, assigning new tasks, workflow management, etc.

FIGS. 6A-6B illustrate a flow diagram of a process 600 used in some implementations for computing the regression confidence of the current revision. Process 600 begins at block 605 by identifying a set of revisions relative to the current revision. For example, process 600 identifies a set of revisions before and a set of revisions after the current revision (e.g., four revisions before and four revisions after the current revision). At block 610, process 600 identifies a set of successful revisions. For example, process 600 can evaluate the revisions before and after the current revision to identify a subset of revisions before and a subset of revisions after the current revision. For each of these subsets, process 600 evaluates the execution of revisions in each subset to identify a further subset of revisions that were successfully executed (both before and after the current revision). At decision block 615, process 600 determines whether all revisions in the set have successfully completed execution and have generated the necessary data (e.g., metric(s) value time series). If all revisions in the set of revisions have not successfully completed execution, at block 617, process 600 executes the remaining revisions. Process 600 can ensure that there exists a minimum number of successful revisions (e.g., on either side of the current revision). On the other hand, if all revisions in the set of revisions have successfully completed execution, at block 620, process 600 filters the revisions that failed execution and/or are currently running. Process 600 can also identify a subset of usable revisions.

At blocks 630 to 640, process 600 performs a set of steps for each simulation. Process 600 runs a number of simulations to remove variance. The number of simulations can be predetermined (e.g., using configuration settings), or can be determined dynamically based on one or more factors (e.g., priority of change, amount of source code changed in source code revisions, time of day, special circumstances, etc.). At block 630, process 600 executes a simulation for each revision in the subset of usable revisions. Each simulation can return a list of numbers randomly selected from a normal distribution based on the corresponding revision's mean and its standard error.

At block 635, process 600 computes a delta value for the current revision. For example, for each specific usable revision in the subset of usable revisions, process 600 executes the specific simulation of the specific useable revision and computes a value of the metric for the specific simulation. Once metric values for each specific usable revision are computed, process 600 can compute an average of various subsets of the metric values. For example, process 600 can compute a before-average value, i.e. an average of metric values of revisions before the current revision in the subset of usable revisions. As another example, process 600 can compute an after-average value, i.e. an average of metric values of revisions after the current revision in the subset of usable revisions. Process 600 can then compute a delta value for the current revision as the difference between the before-average value and the after-average value.

At decision block 640, process 600 determines whether all of the number of simulations have been executed to generate a set of delta values (size of set =number of simulations). If all simulations have not been executed, process 600 returns to block 630 to repeat blocks 630 and 635 for each remaining simulation. On the other hand, if all simulations have been executed, at block 645, process 600 computes a combined delta value for the current revision over all simulations. For example, process 600 can compute an average of the delta values in the set of delta values. At block 650, process 600 computes the standard deviation value for the current revision based on the delta values in the set of delta values.

At block 655, process 600 computes a regression confidence interval for the current revision using a range for a probability distribution based on the combined delta value and the standard deviation value. Regression confidence interval can be defined using, for example, a lower bound and an upper bound. For example, process 600 can compute first lower percentile and upper percentile values based on the confidence interval (stored as a configuration parameter value):

lower percentile=(1.0−confidence interval)/2
upper percentile=(1.0+confidence interval)/2

For example, for 98% regression confidence level, the lower percentile is 1 and the upper percentile is 1% (i.e., 1% below and 1% above). The lower percentile and upper percentile can then be used to compute a lower bound and an upper bound of the regression confidence interval for the current revision. For example, process 600 can use a probability distribution function, such as the percent point function, to compute the lower and upper bounds:

lower bound=percent point function (lower percentile, combined delta, standard deviation)
upper bound=percent point function (upper percentile, combined delta, standard deviation)

At block 660, process 600 computes a regression confidence value for the current revision using a probability density function based on the combined delta value and the standard deviation value. For example, process 600 can use a distribution function, such as the cumulative distribution function, to compute the regression confidence value for the current revision:

regression confidence value=1.0−cumulative distribution function (combined delta, standard deviation)

At block 665, process 600 computes a highest regression confidence value for the current revision. Given a set of revisions that have a statistically significant difference in values, highest regression confidence value can be used to identify at least one revision that introduced the difference. In some implementations, process 600 computes the highest regression confidence value as the highest confidence value of revisions in the set of useable revisions. In some implementations, process 600 computes the highest regression confidence value as the highest confidence value of revisions in a highest confidence radius (stored as a configuration parameter value). Revisions in the highest confidence radius comprise a set of revisions surrounding the current revision that must have a smaller lower bound in order for the current revision to be considered as a potential regression revision.

FIG. 7 illustrates a flow diagram of a process 700 used in some implementations for identifying significant step changes (potential regression incidents). For each revision, process 700 determines if it caused a potential regression incident. If a current revision is a potential increase and the lower bound of the regression confidence interval for the revision is higher than all revisions in the highest confidence radius (stored as a configuration parameter value), then it may be identified as a potential regression revision. Similarly, if a current revision is a potential decrease and the upper bound of the regression confidence interval for the revision is lower than all revisions in the highest confidence radius (stored as a configuration parameter value), then it may be identified as a potential regression revision.

At block 705, process 700 identifies if the current revision is a potential increase or a potential decrease based on, for example, the regression confidence interval (lower and upper bounds) and highest confidence radius. In some implementation, process 700 can trigger the identification of revisions as potential regression revisions based on trigger configuration parameter values. For example, trigger configuration parameter values can be used to trigger identification of revisions as potential regression revisions for (significant) increases in metric values, (significant) decreases in metric values, or both increases and decreases in metric values. As an example, a trigger configuration parameter value of trigger_on_up (e.g., trigger_on_up=true) can be used to trigger identification of revisions as potential regression revisions only for instances when the confidence interval value of a metric (e.g., CPU usage) is greater than the confidence level; for instances when the confidence interval value of the metric is less than the confidence level, a potential regression incident may not be triggered. Similarly, a trigger configuration parameter value of trigger_on_ down (e.g., trigger_on_down =true) can be used to trigger identification of revisions as potential regression revisions only for instances when the confidence interval value of a metric (e.g., time to open applications) is less than the confidence level; for instances when the confidence interval value of the metric is greater than the confidence level, a potential regression incident may not be triggered.

The potential increase or potential decrease triggers can be stored as configuration parameter values. At decision block 710, process 700 determines if the regression confidence value for the current revision is greater than the regression confidence value for the metric (stored as a configuration parameter). If the regression confidence value for the current revision is less than the regression confidence value for the metric, at block 725, the current revision is not identified as a potential regression revision. However, if the regression confidence value for the current revision is greater than the regression confidence value for the metric, at block 715, process 700 determines if the combined delta value for the current revision is greater than the product of the average of delta values for all revisions in set of usable revisions and a minimum significant change parameter (stored as a configuration parameter). If yes, at block 720, process 700 identifies the current revision as a potential regression revision. If not, at block 725, the current revision is not identified as a potential regression revision.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the implementations. Accordingly, the implementations are not limited except as by the appended claims.

Reference in this specification to "one implementation," "an implementation," or "some implementations" means that a particular feature, structure, or characteristic described in connection with the implementation is included in at least one implementation of the disclosure. The appearances of the phrase "in some implementations" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various implementations given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Without intent to further limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for software testing, the method comprising:
   determining a set of useable revisions relative to a current revision of source code; for each specific simulation of one or more simulations:
      for each specific usable revision of the set of useable revisions:
         executing a specific simulation of the specific useable revision; and
         computing a value of a metric for the specific simulation;
      computing a before-average value of a set of values of the metric corresponding to usable revisions before the current revision;
      computing an after-average value of a set of values of the metric corresponding to usable revisions after the current revision; and
      computing a delta value between the before-average value and the after-average value;
   computing a combined delta value and a standard deviation value based on the delta values computed for each specific simulation;
   computing a regression confidence interval for the current revision by computing a range for a probability distribution based on the combined delta value and the standard deviation value;
   computing a regression confidence value for the current revision by computing a probability density based on the combined delta value and the standard deviation value; and
   determining whether the current revision is a potential regression revision based on a comparison of the regression confidence interval with the regression confidence value.

2. The method of claim 1, wherein the metric is one of:
   time to open applications,
   time for user interaction,
   memory consumption,
   battery consumption,
   bytes read from memcache, or
   CPU instructions.

3. The method of claim 1, wherein the set of usable revisions is based on execution outcomes of one or more revisions of the source code.

4. The method of claim 1, wherein the regression confidence interval comprises a lower bound and an upper bound.

5. The method of claim 4, wherein the lower bound and the upper bound of the regression confidence interval are based on the regression confidence value, wherein the regression confidence value indicates a confidence that the current revision is a potential regression revision.

6. The method of claim 1, further comprising:
   executing a specific simulation of the current revision; and
   computing a value of a metric for the current revision.

7. The method of claim 4, further comprising:
   computing a highest confidence radius based the regression confidence value for each revision in the set of usable revisions.

8. The method of claim 7, wherein determining whether the current revision is a potential regression revision is further based on comparing the highest confidence radius with the lower bound, the upper bound, or a combination thereof.

9. The method of claim 1, wherein determining whether the current revision is a potential regression revision is further based on comparing the combined delta value with a product of a minimum significant change parameter and an average of delta values for each revision in the set of usable revisions.

10. The method of claim 1 further comprising:
    determining a correlation between a first regression confidence value of a first metric and a second regression confidence value of a second metric; and
    generating a regression incident report wherein the first metric and the second metric are grouped together.

11. A system for software testing, the system comprising:
    one or more processors;
    a memory;
    a regression identification engine configured to:
       determine a set of useable revisions relative to a current revision of source code;
       for each specific simulation of one or more simulations:
          for each specific usable revision of the useable revisions:
             execute a specific simulation of the specific useable revision; and
             compute a value of a metric for the specific simulation;
          compute a first average value of a set of values of the metric corresponding to a first portion of the set of usable revisions;
          compute a second average value of a set of values of the metric corresponding to a second portion of the set of usable revisions; and
          compute a delta value of the metric between the first average value and the second average value;
       compute a combined delta value based on the delta values computed for each specific simulation;
       compute a regression confidence interval for the current revision by computing a range for a probability distribution based on the combined delta value;
       compute a regression confidence value for the current revision by computing a probability density based on the combined delta value; and
       identify the current revision as a potential regression revision based on a comparison of the regression confidence interval with the regression confidence value.

12. The system of claim 11, wherein the metric is one of:
    time to open applications,
    time for user interaction,
    memory consumption,
    battery consumption,
    bytes read from memcache, or
    CPU instructions.

13. The system of claim 11, wherein the set of usable revisions is based on execution outcomes of one or more revisions of the source code.

14. The system of claim 11, wherein the regression confidence interval comprises a lower bound and an upper bound, wherein the lower bound and the upper bound of the regression confidence interval are based on the regression confidence value, wherein the regression confidence value indicates a confidence that the current revision is a potential regression revision.

15. The system of claim 14, wherein the regression identification engine is further configured to:
compute a highest confidence radius based the regression confidence value for each revision in the set of usable revisions,
wherein identifying the current revision as a potential regression revision is further based on comparing the highest confidence radius with the lower bound, the upper bound, or a combination thereof.

16. The system of claim 11, wherein determining whether the current revision is a potential regression revision is further based on comparing the combined delta value with a product of a minimum significant change parameter and an average of delta values for each revision in the set of usable revisions.

17. The system of claim 11 further comprising a metrics analysis manager configured to:
determine a correlation between a first regression confidence value of a first metric and a second regression confidence value of a second metric; and
generate a regression incident report wherein the first metric and the second metric are grouped together.

18. A non-transitory computer-readable storage medium storing instructions that, when executed by a computing system, cause the computing system to perform operations for software testing, the operations comprising:
for each specific simulation of one or more simulations:
for each specific usable revision of a set of useable revisions:
computing a value of a metric for the specific simulation of the specific usable revision;
computing a first average value of a set of values of the metric corresponding to a first portion of the set of usable revisions;
computing a second average value of a set of values of the metric corresponding to a second portion of the set of usable revisions;
computing a delta value of the metric between the first average value and the second average value;
computing a combined delta value and a standard deviation value based on the delta values computed for each specific simulation;
computing a regression confidence interval for a current revision by computing a range for a probability distribution based on the combined delta value and the standard deviation value;
computing a regression confidence value for the current revision by computing a probability density based on the combined delta value and the standard deviation value; and
determining whether the current revision is a potential regression revision based on a comparison of the regression confidence interval with the regression confidence value.

19. The non-transitory computer-readable storage medium of claim 18, wherein the operations further comprise:
computing a highest confidence radius based the regression confidence value for each revision in the set of usable revisions,
wherein identifying the current revision as a potential regression revision is further based on comparing the highest confidence radius with a lower bound of the regression confidence interval, an upper bound of the regression confidence interval, or a combination thereof.

20. The non-transitory computer-readable storage medium of claim 18, wherein the metric is one of:
time to open applications,
time for user interaction,
memory consumption,
battery consumption,
bytes read from memcache, or
CPU instructions.

* * * * *